US012658165B2

(12) United States Patent
Kolwyck

(10) Patent No.: US 12,658,165 B2
(45) Date of Patent: Jun. 16, 2026

(54) WIND CHIME DEVICE

(71) Applicant: Mark Kolwyck, Benton, MO (US)

(72) Inventor: Mark Kolwyck, Benton, MO (US)

( * ) Notice: Subject to any disclaimer, the term of this patent is extended or adjusted under 35 U.S.C. 154(b) by 294 days.

(21) Appl. No.: 18/640,151

(22) Filed: Apr. 19, 2024

(65) Prior Publication Data

US 2025/0329315 A1 Oct. 23, 2025

(51) Int. Cl.
*G10F 1/06* (2006.01)
*G10F 1/12* (2006.01)

(52) U.S. Cl.
CPC . *G10F 1/06* (2013.01); *G10F 1/12* (2013.01)

(58) Field of Classification Search
CPC .................................... G10F 1/06; G10F 1/12
See application file for complete search history.

(56) References Cited

U.S. PATENT DOCUMENTS

| | | | | |
|---|---|---|---|---|
| D272,900 S | | 3/1984 | Obst | |
| 4,466,327 A | * | 8/1984 | Hinton | G10F 1/06 84/95.2 |
| 4,693,162 A | | 9/1987 | Lee | |
| 4,872,387 A | | 10/1989 | Melia | |
| 5,238,439 A | | 8/1993 | Greene | |
| 5,334,797 A | | 8/1994 | Niedge | |
| 5,648,624 A | | 7/1997 | Smith | |
| 7,749,044 B1 | | 7/2010 | Herglotz | |

FOREIGN PATENT DOCUMENTS

| | | |
|---|---|---|
| GB | 2138617 | 10/1984 |

* cited by examiner

*Primary Examiner* — Laura K Tso

(57) ABSTRACT

A wind chime device includes a base that is vertically elongated and is substantially foraminous to pass sound and air through the base. A chime unit is removably insertable into the base and the chime unit includes a barrel and a comb. The comb including a plurality of bristles and the barrel has a plurality of knobs to pluck respective ones of the plurality of bristles when the barrel is rotated to produce a melody. A wind vane is removably attachable to the chime unit and the wind vane is positioned above the base such that the wind vane is exposed to wind. The wind vane rotates the barrel of the chime unit when the wind vane is rotated thereby facilitating each of the plurality of knobs on the barrel to pluck the respective bristle on the comb to facilitate the chime unit to produce the melody.

16 Claims, 9 Drawing Sheets

WIND CHIME DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wind chime devices and more particularly pertains to a new wind chime device for producing a pleasing melody for the enjoyment of a user. The device includes a base and a chime unit that is positionable within the base. The chime unit includes a barrel which as a plurality of strategically arranged knobs and comb which is plucked by the knobs to produce a pleasing melody. The device includes a wind vane that is attached to the barrel such that the wind vane rotates the barrel when the wind vane is exposed to wind.

(2) Description of Related Art Including Information Disclosed Under 37 CFR 1.97 and 1.98

The prior art relates to wind chime devices including a variety of wind chime devices that each at least includes a propeller that is driven by wind and a music box in mechanical communication with the propeller which includes a barrel and a comb for producing a melody when the propeller rotates the barrel. In no instance does the prior art disclose a wind chime device that includes a chime unit, which includes a barrel and a comb, which is removably insertable into a vertically elongated base and a spherical wind vane in mechanical communication with the chime unit for rotating the barrel to produce a melody.

BRIEF SUMMARY OF THE INVENTION

An embodiment of the disclosure meets the needs presented above by generally comprising a base that is vertically elongated and is substantially foraminous to pass sound and air through the base. A chime unit is removably insertable into the base and the chime unit includes a barrel and a comb. The comb including a plurality of bristles and the barrel has a plurality of knobs to pluck respective ones of the plurality of bristles when the barrel is rotated to produce a melody. A wind vane is removably attachable to the chime unit and the wind vane is positioned above the base such that the wind vane is exposed to wind. The wind vane rotates the barrel of the chime unit when the wind vane is rotated thereby facilitating each of the plurality of knobs on the barrel to pluck the respective bristle on the comb to facilitate the chime unit to produce the melody.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
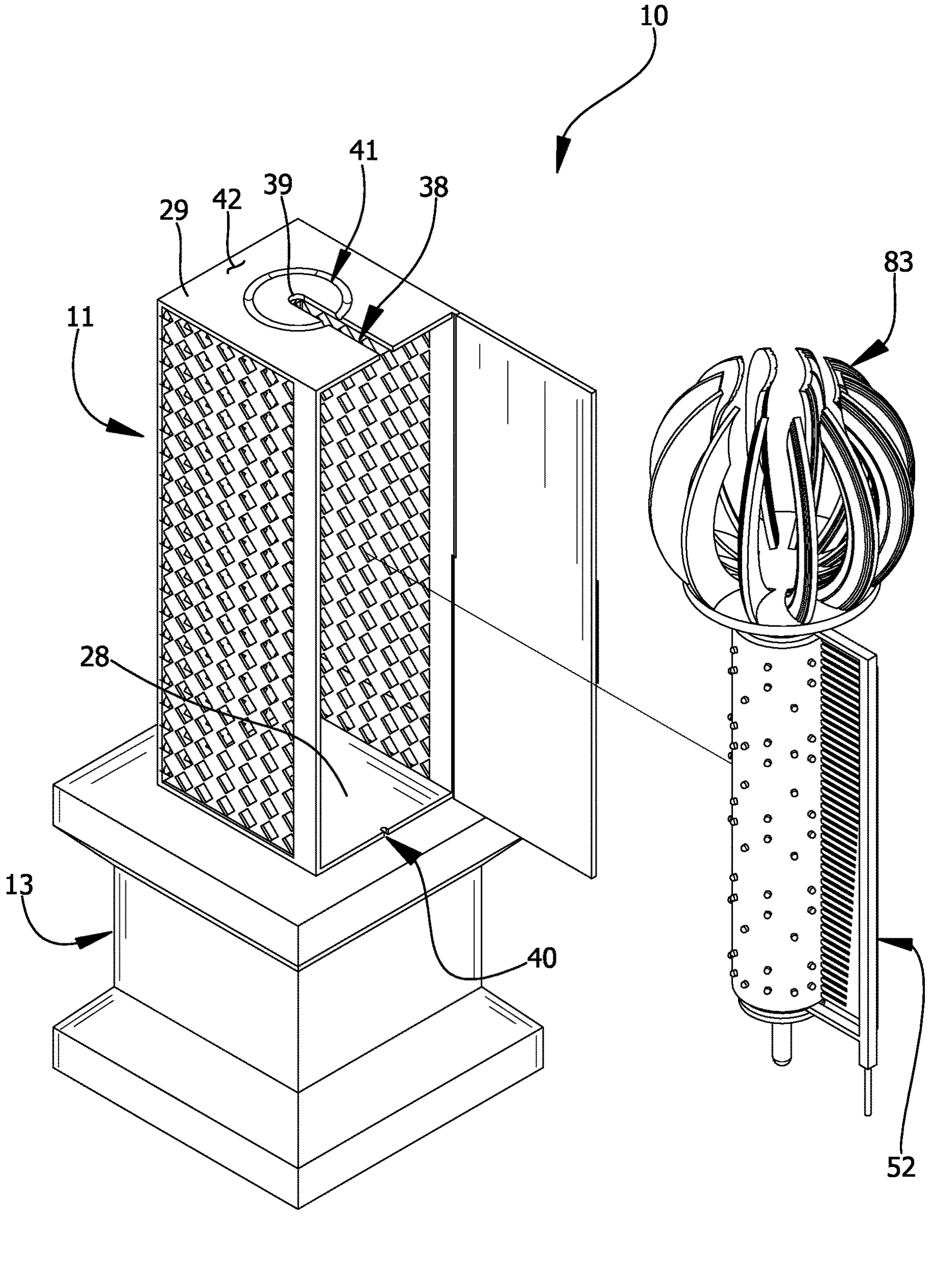
FIG. 1 is an exploded perspective view of a wind chime device according to an embodiment of the disclosure.
Figure 2:
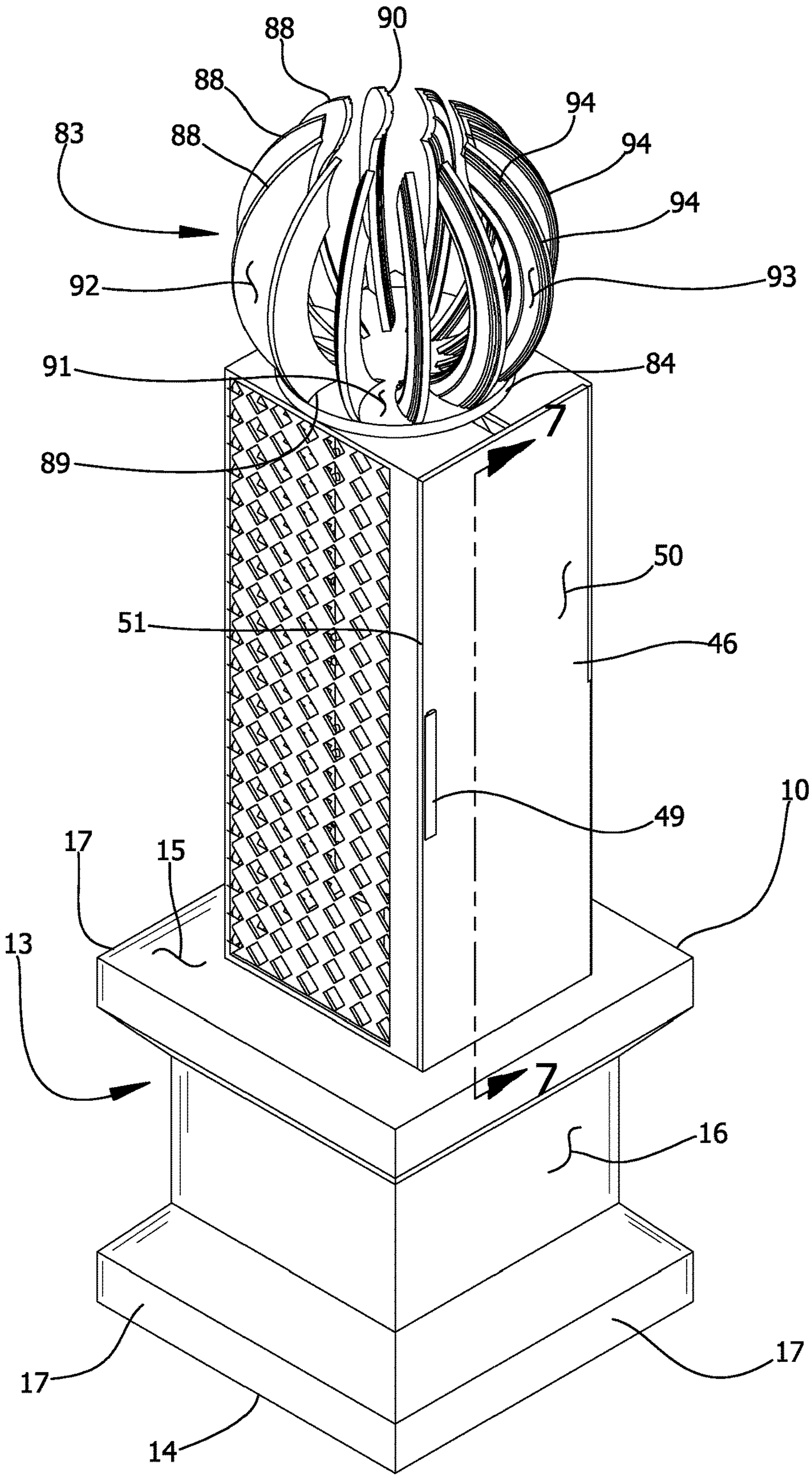
FIG. 2 is a back perspective view of an embodiment of the disclosure showing a door in a closed position.
Figure 3:
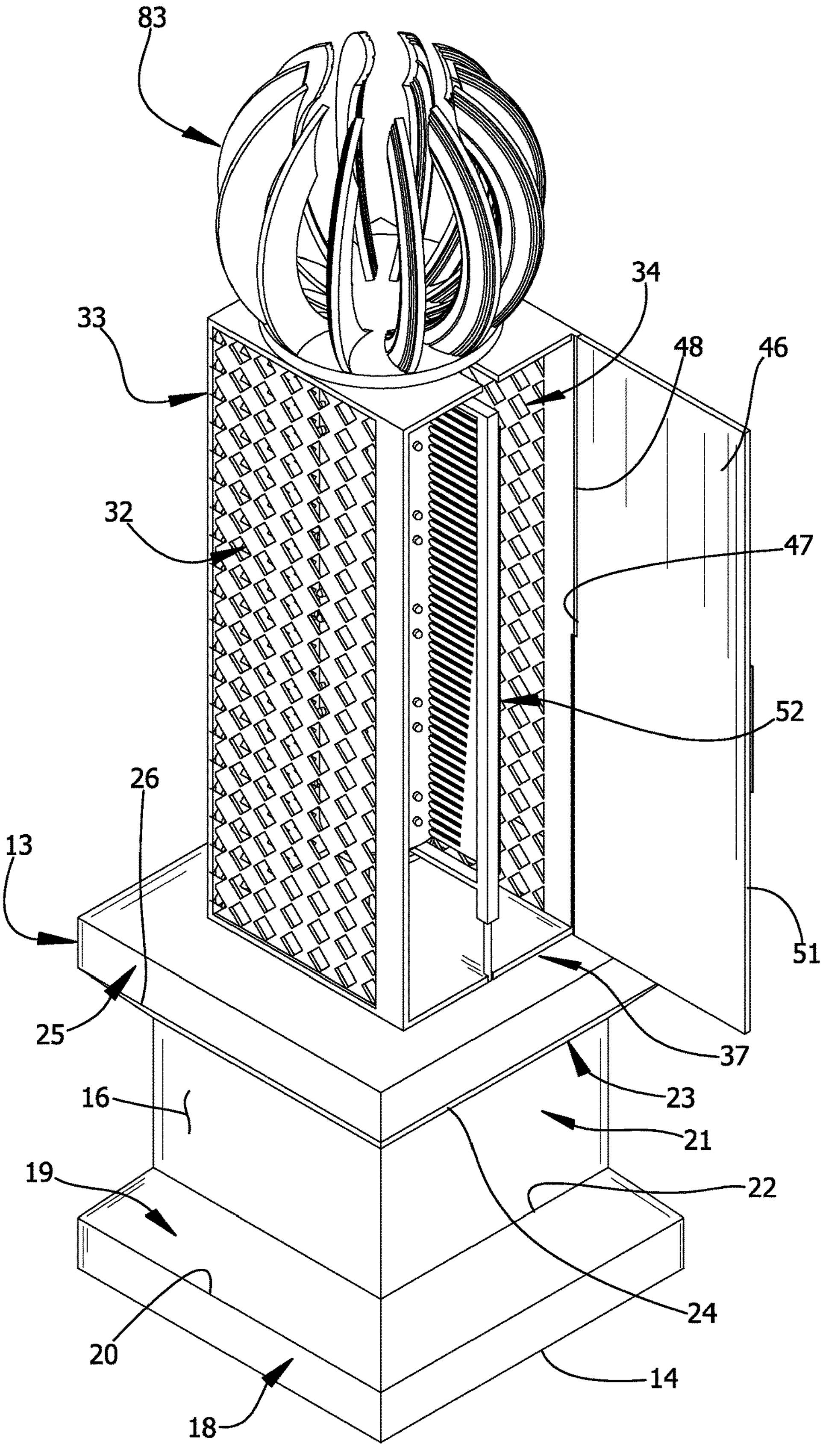
FIG. 3 is a back perspective view of an embodiment of the disclosure showing a door in an open position.
Figure 4:
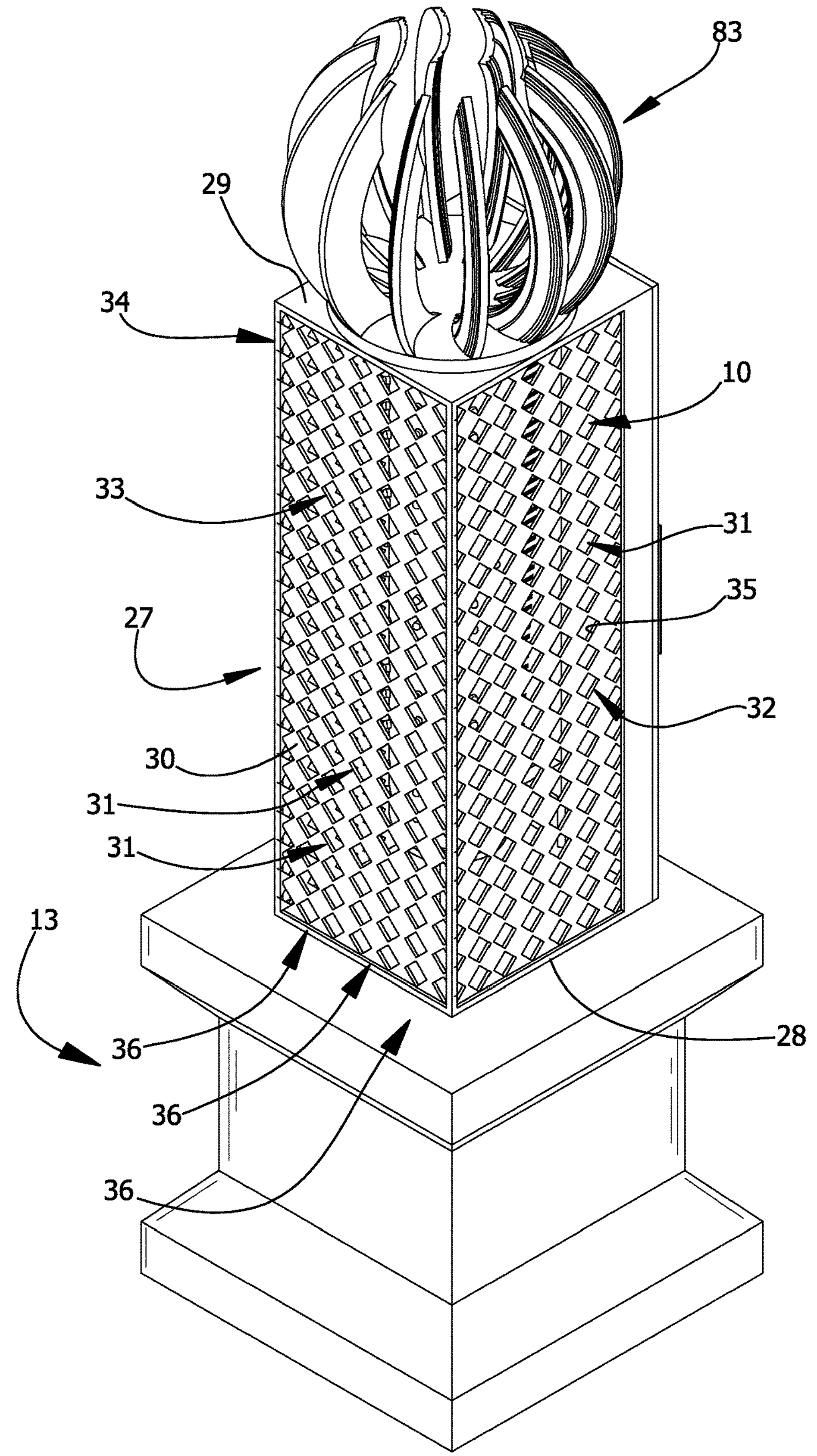
FIG. 4 is a perspective view of an embodiment of the disclosure.
Figure 5:
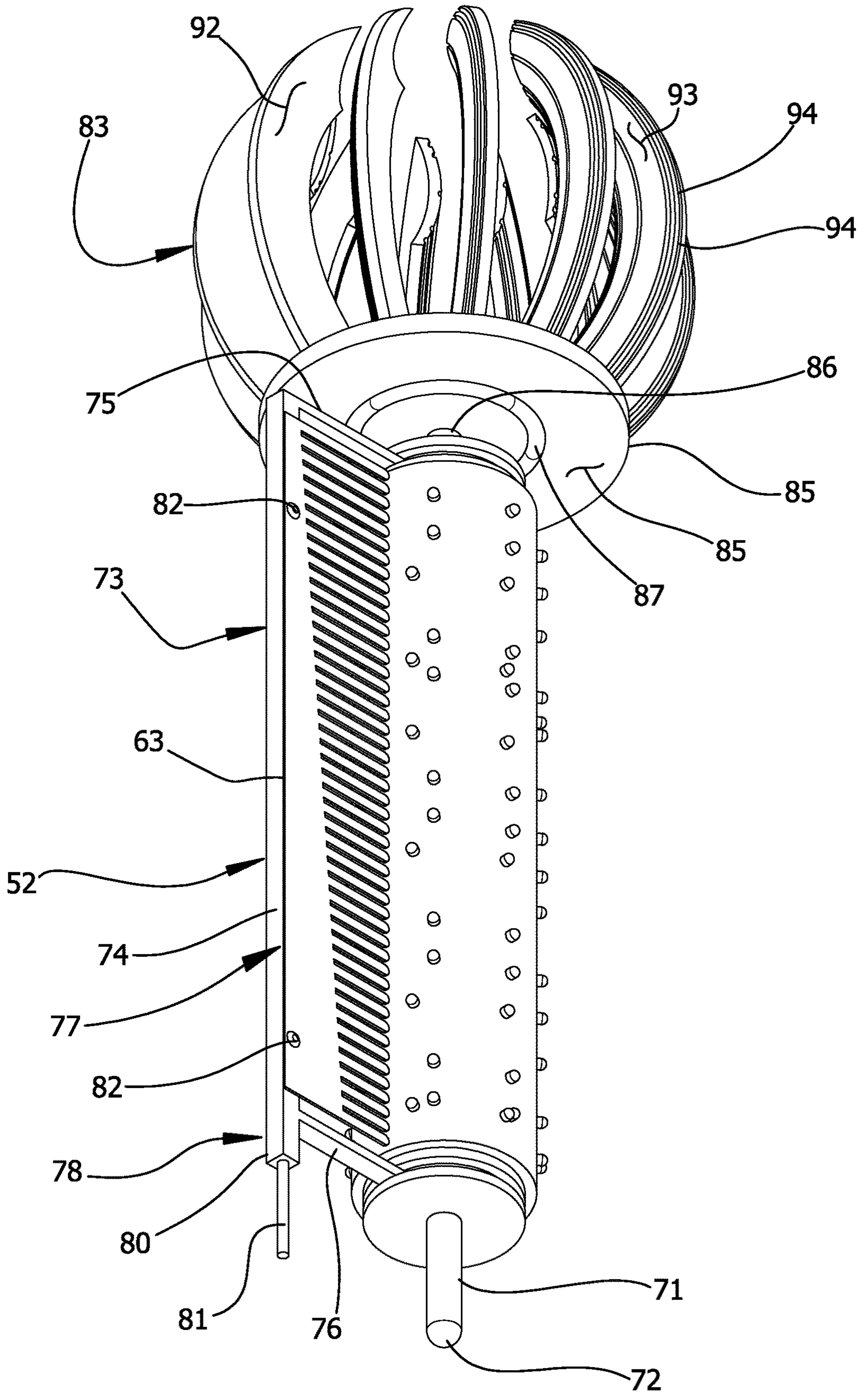
FIG. 5 is a perspective view of a chime unit and a wind vane of an embodiment of the disclosure.
Figure 6:
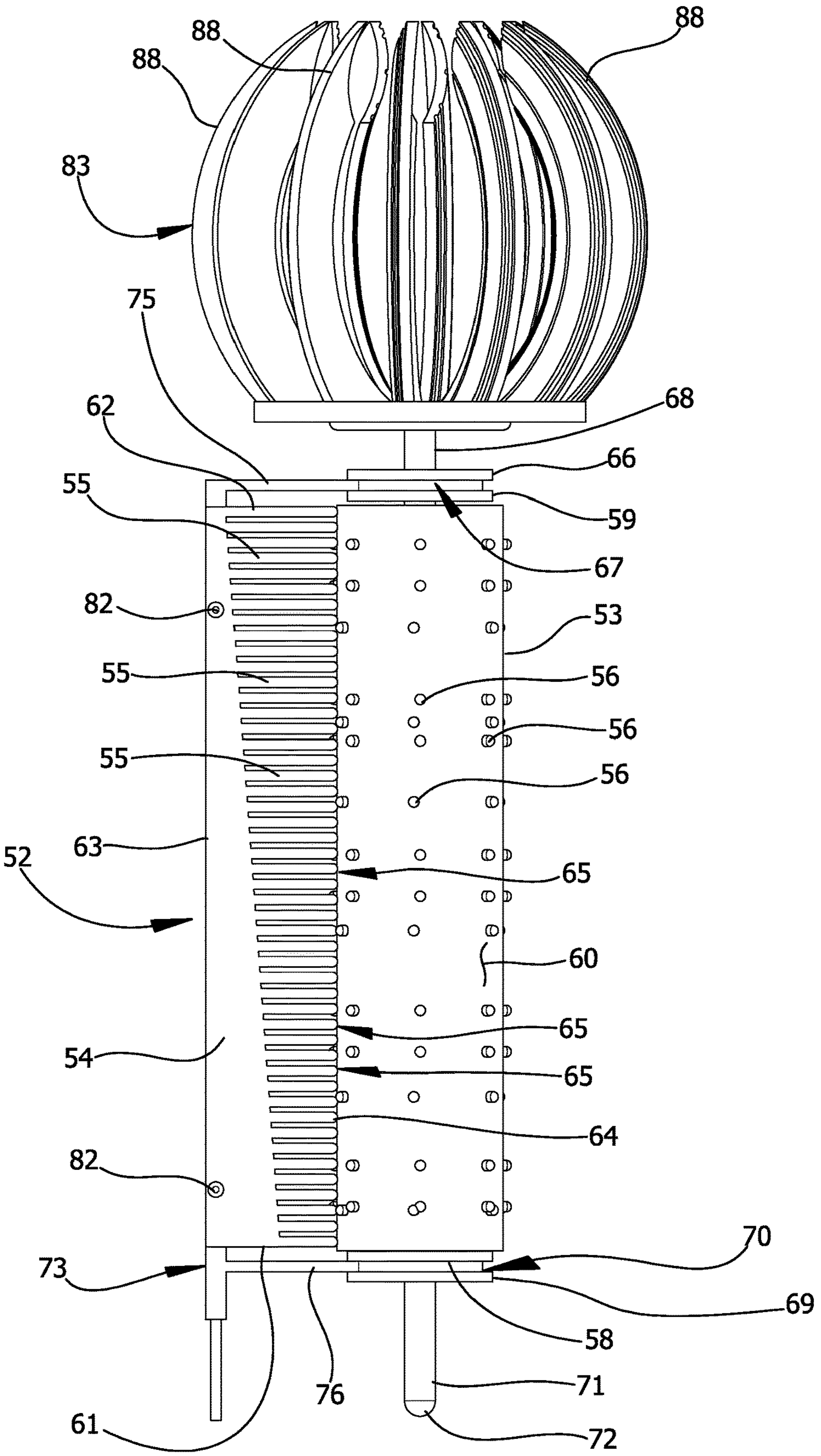
FIG. 6 is a right side view of a chime unit and a wind vane of an embodiment of the disclosure.
Figure 7:
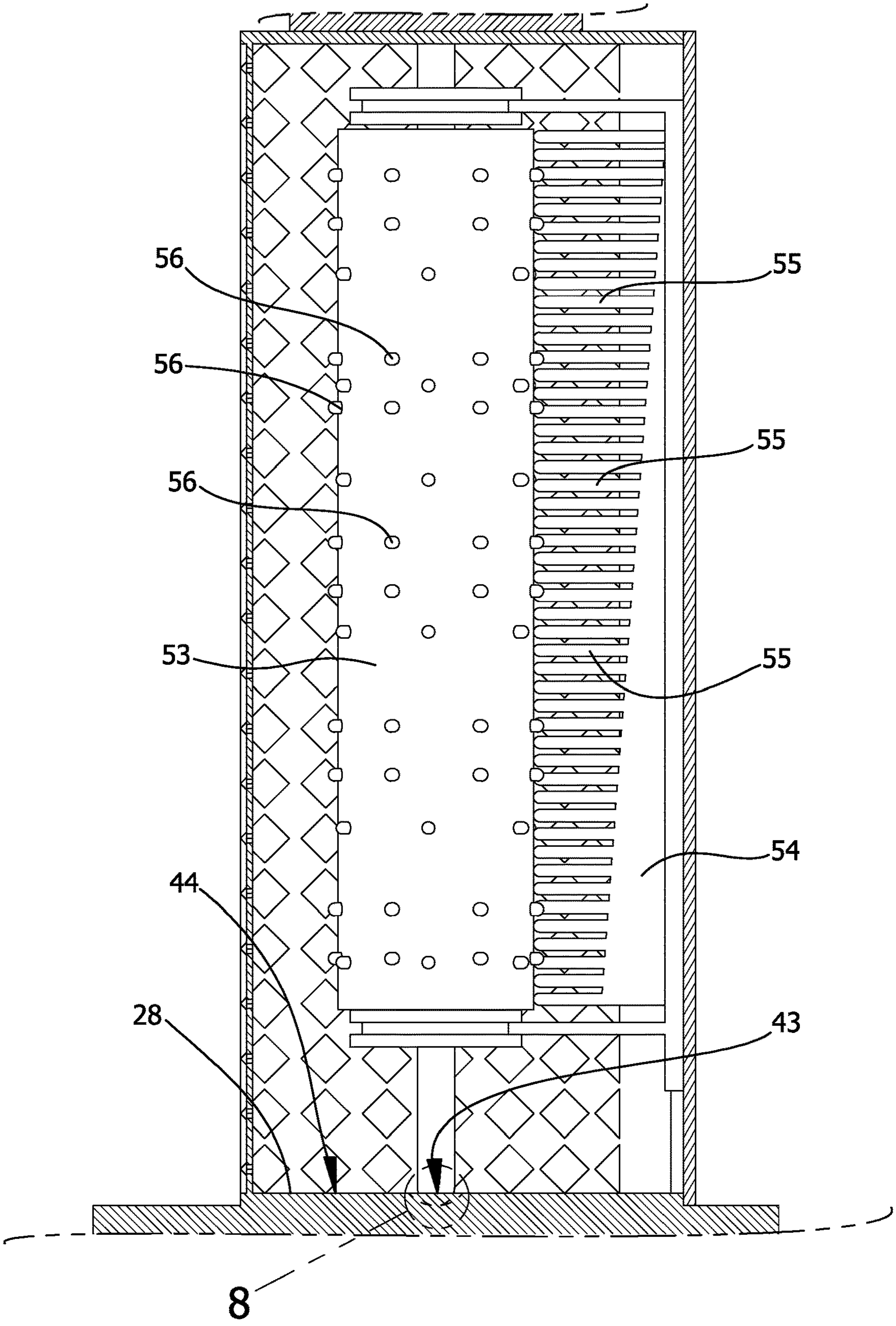
FIG. 7 is a cross sectional view taken along line 7-7 of FIG. 2 of an embodiment of the disclosure.
Figure 8:
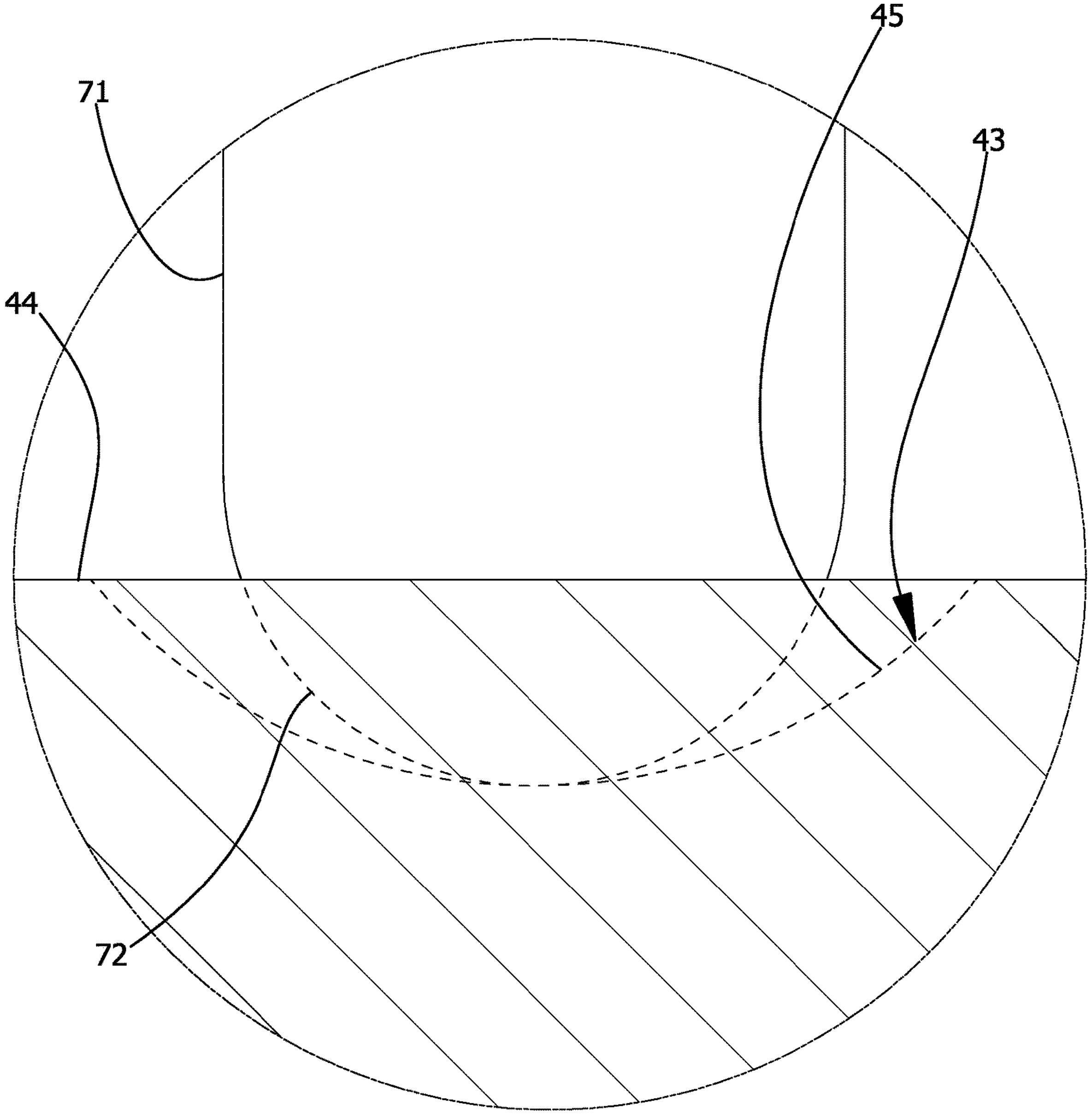
FIG. 8 is a magnified detail view taken from circle 8 of FIG. 7 of an embodiment of the disclosure.
Figure 9:
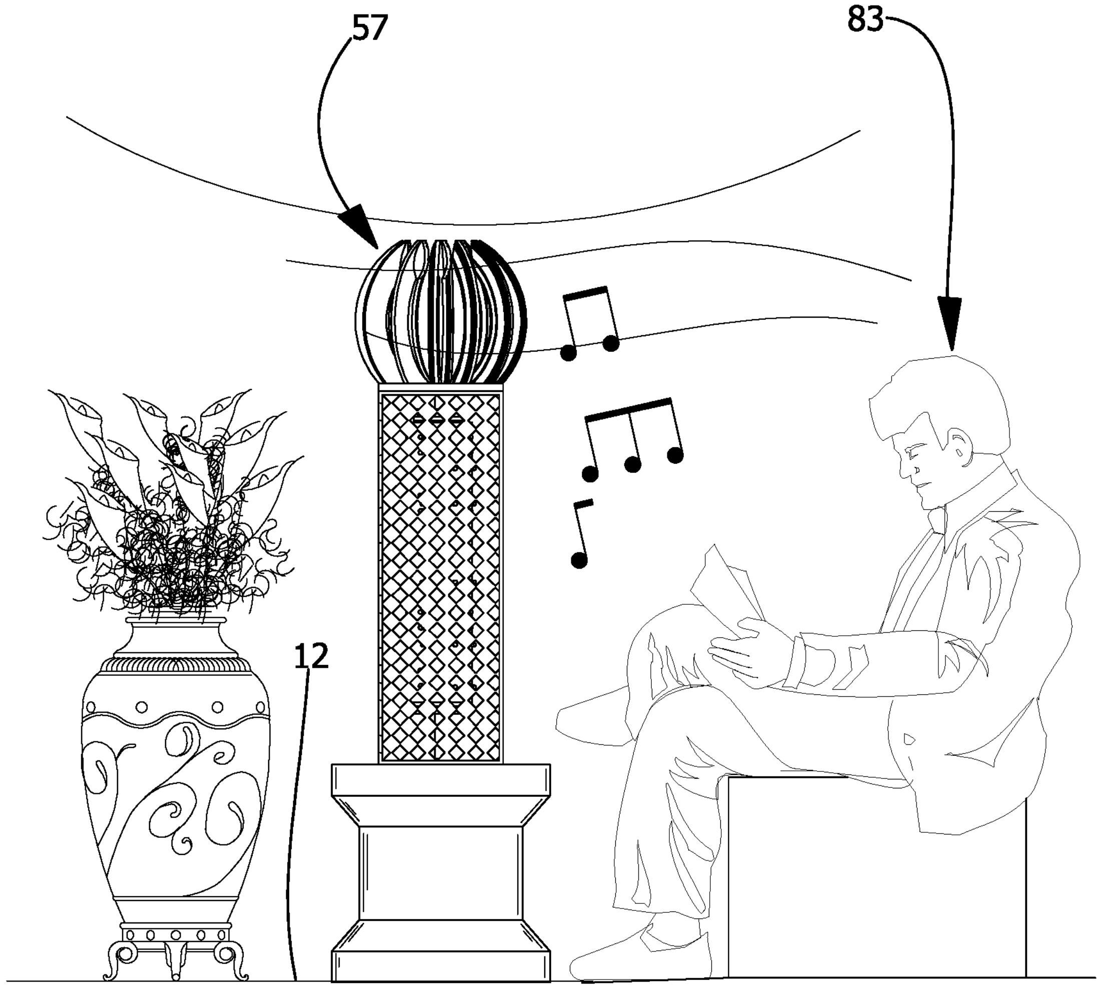
FIG. 9 is a perspective in-use view of an embodiment of the disclosure.

With reference now to the drawings, and in particular to FIGS. 1 through 9 thereof, a new wind chime device embodying the principles and concepts of an embodiment of the disclosure and generally designated by the reference numeral 10 will be described.

As best illustrated in FIGS. 1 through 9, the wind chime device 10 generally comprises a base 11 that is vertically elongated such that the base 11 extends a substantial height from a support surface 12. The support surface 12 may be any horizontal support surface 12 that is located outside, including but not being limited to the floor of a patio or the ground. Additionally, the base 11 is substantially foraminous such that sound and air can pass through the base 11. The base 11 comprises a pedestal 13 that has a lower surface 14 and an upper surface 15 and an exterior surface 16 extending between the lower surface 14 and the upper surface 15. The exterior surface 16 has a plurality of perpendicularly oriented sides 17 such that the pedestal 13 has a rectangular shape.

The exterior surface 16 has a first section 18 which is perpendicularly oriented with the lower surface 14 and a second section 19 angling inwardly from an upper threshold 20 of the first section 18. The exterior surface 16 has a third section 21 extending upwardly from an upper threshold 22 of the second section 19 such that the third section 21 lies on a plane that is oriented parallel to the first section 18. Additionally, the exterior surface 16 has a fourth section 23 angling outwardly from an upper threshold 24 of the third section 21 and a fifth section 25 extending between from an upper threshold 26 of the fourth section 23 and the upper surface 15 such that the fifth section 25 lies on a plane that is coplanar with the first section 18.

The base 11 includes a box 27 extending upwardly from the upper surface 15 of the pedestal 13 and the box 27 is centrally located on the upper surface 15. The box 27 has a bottom wall 28 and a top wall 29 and an outer wall 30 extending between the bottom wall 28 and the top wall 29. Additionally, the outer wall 30 has a plurality of holes 31 each extending through a respective one of each of a first side 32 and a second side 33 and a third side 34 of the outer wall 30. Furthermore, each of the plurality of holes 31 has a bounding edge 35 comprising a plurality of perpendicularly oriented sides such that each of the plurality of holes 31 has a diamond shape. The plurality of holes 31 on each of the first side 32 and the second side 33 and the third side 34 is arranged in a plurality of columns 36 extending along a substantial height of the first side 32 and the second side 33 and the third side 34. Additionally, the outer wall 30 has a fourth side 37 that is open into an interior of the box 27.

The box 27 has a slot 38 extending through the top wall 29 and the slot 38 extends from the fourth side 37 toward the second side 33 having a terminal end 39 of the slot 38 being centrally located on the top wall 29. The box 27 has a notch 40 extending into the bottom wall 28 and the notch 40 extends from the fourth side 37 toward the second side 33 and the notch 40 is centrally located between the first side 32 and the third side 34. The box 27 has a recess 41 extending downwardly into a topmost surface 42 of the top wall 29 and the recess 41 is continuously arcuate about the terminal end 39 of the slot 38 such that the recess 41 defines a ring extending around the terminal end 39. The box 27 has a depression 43 extending downwardly into an uppermost surface 44 of the bottom wall 28 of the box 27. The depression 43 is centrally located on the bottom wall 28 and the depression 43 has a bounding surface 45 which is concavely arcuate with respect to the uppermost surface 44.

The base 11 includes a door 46 which has a first edge 47 that is hingedly coupled to a terminal edge 48 of the third side 34 of the outer wall 30 of the box 27. The door 46 is positionable in a closed position having the door 46 covering the fourth side 37 of the outer wall 30. Conversely, the door 46 is positionable in an open position having the fourth side 37 being exposed to access the interior of the box 27. A handle 49 is attached to an outwardly facing surface 50 of the door 46 for gripping to facilitate the door 46 to be manipulated between the open position or the closed position and the handle 49 is aligned with a second edge 51 of the door 46. The base 11 is comprised of a resilient material, including but not being limited to plastic or metal, which is capable of withstanding exposure to the elements without being degraded by moisture or sunlight. Furthermore, the pedestal 13 is weighted to inhibit the base 11 from being tipped over by wind or by being inadvertently struck by an individual.

A chime unit 52 is provided and the chime unit 52 is removably insertable into the base 11; the chime unit 52 includes a barrel 53 and a comb 54. The comb 54 includes a plurality of bristles 55 which each has a unique length with respect to each other thereby facilitating each of the bristles 55 to produce a sound of a unique pitch when the bristles 55 are plucked. The barrel 53 has a plurality of knobs 56 each being strategically arranged on the barrel 53 such that each of the knobs 56 plucks respective ones of the plurality of bristles 55 when the barrel 53 is rotated. In this way the chime unit 52 can produce a melody to enhance enjoyment of a user 57 listening to the melody produced by the chime unit 52. The plurality of bristles 55 may number between thirty two bristles 55 or seventy two bristles 55 to facilitate the comb 54 to produce several octaves of musical notes.

The barrel 53 has a bottom end 58 and a top end 59 and an exterior surface 60 extending between the top end 59 and the bottom end 58. Each of the plurality of knobs 56 extends outwardly from the exterior surface 60 of the barrel 53 and the knobs 56 are spaced apart from each other and are distributed between the top end 59 and the bottom end 58 in a predetermined arrangement. The predetermined arrangement may correspond to a well-known song or melody commonly associated with mechanical music boxes. The comb 54 has a lower edge 61 and an upper edge 62; the comb 54 has a rear edge 63 extending between the lower edge 61 and the upper edge 62 and the comb 54 has a front edge 64 extending between the lower edge 61 and the upper edge 62.

The comb 54 has a plurality of slots 65 each extending from the front edge 64 toward the rear edge 63. The slots 65 are evenly spaced apart from each other and are distributed between the lower edge 61 and the upper edge 62 such that the plurality of slots 65 defines the plurality of bristles 55. The comb 54 is comprised of a resonant material thereby facilitating the plurality of bristles 55 to produce an audible sound when the plurality of bristles 55 are plucked. Furthermore, the plurality of slots 65 increase in length between the lower edge 61 and the upper edge 62 thereby facilitating the plurality of bristles 55 to produce the unique pitch with respect to each other.

The chime unit 52 includes a first bearing 66 that is removably attachable to the top end 59 of the barrel 53 such that the first bearing 66 defines a first space 67 between the top end 59 of the barrel 53 and the first bearing 66. Additionally, the first bearing 66 includes a first shaft 68 which extends upwardly from the first bearing 66. The chime unit 52 includes a second bearing 69 which is removably attachable to the bottom end 58 of the barrel 53 such that the second bearing 69 defines a second space 70 between the bottom end 58 of the barrel 53 and the second bearing 69. The second bearing 69 includes a second shaft 71 extending downwardly from the second bearing 69 and the second shaft 71 has a distal end 72 that is rounded.

The chime unit 52 includes a comb mount 73 that has a central member 74 extending between an upper member 75 and a lower member 76. Each of the upper member 75 and the lower member 76 is perpendicular to the central member 74 such the comb mount 73 has a U-shape. The upper member 75 extends into the first space 67 defined between the first bearing 66 and the top end 59 of the barrel 53. The lower member 76 extends into the second space 70 defined between the second bearing 69 and the bottom end 58 of the barrel 53. The comb 54 lies against the central member 74 such that the rear edge 63 of the comb 54 is aligned with a back edge 77 of the central member 74 thereby aligning each of the bristles 55 with exterior surface 16 of the barrel 53.

The comb mount 73 has a finger 78 extending downwardly from the lower member 76 at a point that is aligned with an intersection between the lower member 76 and the central member 74. The finger 78 has an upper section 80 which has a greater diameter than a lower section 81 of the finger 78. Additionally, the finger 78 is aligned with the second shaft 71 on the second bearing 69. The chime unit 52 includes a pair of fasteners 82 which each extends through the comb 54 and engages the comb mount 73 for attaching the comb 54 to the comb mount 73.

The first shaft 68 of the first bearing 66 extends into the slot 38 in the top wall 29 of the box 27 when the chime unit 52 is inserted into the box 27 such that the first shaft 68 extends upwardly beyond the top wall 29 of the box 27. The distal end 72 of the second shaft 71 on the second bearing 69 is seated in the depression 43 in the uppermost surface 44 of the bottom wall 28 of the box 27 when the chime unit 52 is inserted into the box 27 such that the distal end 72 conforms to curvature of the depression 43. The lower section 81 of the finger 78 on the comb mount 73 is positioned in the notch 40 in the bottom wall 28 of the box 27 when the chime unit 52 is inserted into the box 27 thereby inhibiting the comb mount 73 from rotating when the chime unit 52 is positioned in the box 27.

A wind vane 83 is provided and the wind vane 83 is removably attachable to the chime unit 52. The wind vane 83 is positioned above the base 11 when the chime unit 52 is positioned in the base 11 thereby facilitating the wind vane 83 to be exposed to wind. Thus, the wind vane 83 rotates the barrel 53 of the chime unit 52 when the wind vane 83 is rotated thereby facilitating each of the plurality of knobs 56 on the barrel 53 to pluck the respective bristle on the comb 54. In this way the wind vane 83 facilitates the chime unit 52 to produce the melody.

The wind vane 83 comprises a disk 84 that has a lower surface 85 which is attached to an upper end 86 of the first shaft 68 on the first bearing 66 at a connection point that is centrally located on the lower surface 85 of the disk 84. In this way the disk 84 is spaced upwardly from the top wall 29 of the box 27 when the chime unit 52 is inserted into the box 27. The wind vane 83 includes an annular ring 87 which extends downwardly from the lower surface 85 of the disk 84 and the annular ring 87 surrounds the first shaft 68. Furthermore, the annular ring 87 rests in the recess 41 in the topmost surface 42 of the top wall 29 of the box 27 when the chime unit 52 is inserted into the box 27.

The wind vane 83 includes a plurality of arms 88 and each of the plurality of arms 88 has a lower end 89 and an upper end 90. The lower end 89 of each of the plurality of arms 88 is coupled to an upper surface 91 of the disk 84 such that each of the plurality of arms 88 extends upwardly from the disk 84. The arms 88 are evenly spaced apart from each other and are distributed around a center of the disk 84. Additionally, each of the plurality of arms 88 curves outwardly between the lower end 89 and the upper end 90 such that the plurality of arms 88 curves toward each other at the upper end 90. In this way the plurality of arms 88 defines a spherical shape. The upper end 90 of each of the plurality of arms 88 is scalloped and each of the plurality of arms 88 has a first surface 92 and a second surface 93 each extending between the lower end 89 and upper end 90. The first surface 92 of each of the plurality of arms 88 is concavely arcuate between the upper end 90 and the lower end 89 and the second surface 93 of each of the plurality of arms 88 is convexly arcuate between the upper end 90 and the lower end 89.

Each of the plurality of arms 88 has a series of ridges 94 integrated into the second surface 93 of the plurality of arms 88. The series of ridges 94 on the second surface 93 of each of the plurality of arms 88 extends between the lower end 89 and the upper end 90 of the plurality of arms 88. Furthermore, the series of ridges 94 on the second surface 93 of each of the plurality of arms 88 facilitates the wind to frictionally engage the series of ridges 94 thereby enhancing the wind vane 83 to be rotated by the wind.

In use, the base 11 is positioned at a desired location outdoors and the wind vane 83 is rotated by wind which subsequently causes the barrel 53 to be rotated within the box 27. In this way the knobs 56 on the barrel 53 pluck the bristles 55 on the comb 54 to produce the melody when the barrel 53 is rotated. Thus, the chime unit 52 produces a pleasing melody as compared to traditional wind chimes that typically produce sounds of randomly variable pitches. In this way the user 57 can enjoy a pleasing melody while outdoors instead of the randomly variable pitches that would be produced by traditional wind chimes. Additionally, the barrel 53 can be replaced with a replacement barrel that has a different arrangement of knobs 56 to facilitate the chime unit 52 to produce a different melody. In this way the user 57 can enjoy a wide variety of pleasing melodies rather than only one pleasing melody.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wind chime device for playing a composed melody for the listening enjoyment of a user, said device comprising:

a base being vertically elongated wherein said base is configured to extend a substantial height from a support surface, said base being substantially foraminous wherein said base is configured to facilitate sound and air to pass through said base;

a chime unit being removably insertable into said base, said chime unit including a barrel and a comb, said comb including a plurality of bristles each having a unique length with respect to each other thereby facilitating each of said bristles to produce a sound of a unique pitch when said bristles are plucked, said barrel having a plurality of knobs each being strategically arranged on said barrel such that each of said knobs plucks respective ones of said plurality of bristles when said barrel is rotated thereby facilitating said chime unit to produce a melody wherein said chime unit is configured to enhance enjoyment of a user listening to said melody produced by said chime unit; and a wind vane being removably attachable to said chime unit, said wind vane being positioned above said base when said chime unit is positioned in said base wherein said wind vane is configured to be exposed to wind, said wind vane rotating said barrel of said chime unit when said wind vane is rotated thereby facilitating each of said plurality of knobs on said barrel to pluck said respective bristle on said comb wherein said wind vane is configured to facilitate said chime unit to produce said melody.

2. The device according to claim 1, wherein:

said base comprises a pedestal having a lower surface and an upper surface and an exterior surface extending between said lower surface and said upper surface;

said exterior surface has a plurality of perpendicularly oriented sides such that said pedestal has a rectangular shape;

said exterior surface has a first section being perpendicularly oriented with said lower surface and a second section angling inwardly from an upper threshold of said first section;

said exterior surface has a third section extending upwardly from an upper threshold of said second section such that said third section lies on a plane being oriented parallel to said first section; and said exterior surface has a fourth section angling outwardly from an upper threshold of said third section and a fifth section extending between from an upper threshold of said fourth section and said upper surface such that said fifth section lies on a plane being coplanar with said first section.

3. The device according to claim 2, wherein said base includes:

a box extending upwardly from said upper surface of said pedestal;

said box is centrally located on said upper surface;

said box has a bottom wall and a top wall and an outer wall extending between said bottom wall and said top wall;

said outer wall has a plurality of holes each extending through a respective one of each of a first side and a second side and a third side of said outer wall;

each of said plurality of holes has a bounding edge comprising a plurality of perpendicularly oriented sides such that each of said plurality of holes has a diamond shape;

said plurality of holes on each of said first side and said second side and said third side is arranged in a plurality of columns extending along a substantial height of said first side and said second side and said third side; and said outer wall has a fourth side being open into an interior of said box.

4. The device according to claim 3, wherein:

said box has a slot extending through said top wall; and said slot extends from said fourth side toward said second side having a terminal end of said slot being centrally located on said top wall;

said box has a notch extending into said bottom wall;

said notch extends from said fourth side toward said second side;

said notch is centrally located between said first side and said third side;

said box has a recess extending downwardly into a topmost surface of said top wall;

said recess is continuously arcuate about said terminal end of said slot such that said recess defines a ring extending around said terminal end;

said box has a depression extending downwardly into an uppermost surface of said bottom wall of said box;

said depression is centrally located on said bottom wall; and said depression has a bounding surface being concavely arcuate with respect to said uppermost surface.

5. The device according to claim 3, wherein:

a door having a first edge being hingedly coupled to a terminal edge of said third side of said outer wall of said box, said door being positionable in a closed position having said door covering said fourth side of said outer wall, said door being positionable in an open position having said fourth side being exposed to access said interior of said box; and a handle being attached to an outwardly facing surface of said door for gripping to facilitate said door to be manipulated between said open position or said closed position, said handle being aligned with a second edge of said door.

6. The device according to claim 1, wherein:

said barrel has a bottom end and a top end and an exterior surface extending between said top end and said bottom end;

each of said plurality of knobs extends outwardly from said exterior surface of said barrel;

said plurality of knobs is spaced apart from each other and is distributed between said top end and said bottom end in a predetermined arrangement;

said comb has a lower edge and an upper edge;

said comb has a rear edge extending between said lower edge and said upper edge;

said comb has a front edge extending between said lower edge and said upper edge;

said comb has a plurality of slots each extending from said front edge toward said rear edge;

said plurality of slots is evenly spaced apart from each other and is distributed between said lower edge and said upper edge such that said plurality of slots defines said plurality of bristles;

said comb is comprised of a resonant material thereby facilitating said plurality of bristles to produce an audible sound when said plurality of bristles are plucked; and said plurality of slots increases in length between said lower edge and said upper edge thereby facilitating said plurality of bristles to produce said unique pitch with respect to each other.

7. The device according to claim 6, wherein:

said chime unit includes a first bearing being removably attachable to said top end of said barrel such that said first bearing defines a first space between said top end of said barrel and said first bearing;

said first bearing includes a first shaft extending upwardly from said first bearing;

said chime unit includes a second bearing being removably attachable to said bottom end of said barrel such that said second bearing defines a second space between said bottom end of said barrel and said second bearing;

said second bearing includes a second shaft extending downwardly from said second bearing; and said second shaft has a distal end being rounded.

8. The device according to claim 7, wherein:
said chime unit includes a comb mount having a central member extending between an upper member and a lower member;
each of said upper member and said lower member is perpendicular to said central member such said comb mount has a U-shape;
said upper member extends into said first space defined between said first bearing and said top end of said barrel;
said lower member extends into said second space defined between said second bearing and said bottom end of said barrel;
said comb lies against said central member such that said rear edge of said comb is aligned with a back edge of said central member thereby aligning each of said bristles with exterior surface of said barrel;
said comb mount has a finger extending downwardly from said lower member at a point being aligned with an intersection between said lower member and said central member;
said finger has an upper section having a greater diameter than a lower section of said finger;
said finger is aligned with said second shaft on said second bearing;
said chime unit includes a pair of fasteners; and
each of said fasteners extends through said comb and engages said comb mount for attaching said comb to said comb mount.

9. The device according to claim 4, wherein:
said chime unit includes a first bearing having a first shaft; and
said first shaft of said first bearing extends into said slot in said top wall of said box when said chime unit is inserted into said box such that said first shaft extends upwardly beyond said top wall of said box.

10. The device according to claim 9, wherein:
said chime unit includes a second bearing having a second shaft, said second shaft having a distal end being rounded; and
said distal end of said second shaft on said second bearing is seated in said depression in said uppermost surface of said bottom wall of said box when said chime unit is inserted into said box such that said distal end conforms to curvature of said depression.

11. The device according to claim 4, wherein:
said chime unit includes a comb mount;
said comb mount includes a finger having a lower section; and
said lower section of said finger on said comb mount is positioned in said notch in said bottom wall of said box when said chime unit is inserted into said box thereby inhibiting said comb mount from rotating when said chime unit is positioned in said box.

12. The device according to claim 4, wherein:
said chime unit includes a first bearing having a first shaft, said first shaft having an upper end; and
said wind vane comprises:
a disk having a lower surface being attached to said upper end of said first shaft on said first bearing at a connection point being centrally located on said lower surface of said disk such that said disk is spaced upwardly from said top wall of said box when said chime unit is inserted into said box; and
an annular ring extending downwardly from said lower surface of said disk, said annular ring surrounding said first shaft, said annular ring resting in said recess in said topmost surface of said top wall of said box when said chime unit is inserted into said box.

13. The device according to claim 12, wherein:
said wind vane includes a plurality of arms;
each of said plurality of arms has a lower end and an upper end;
said lower end of each of said plurality of arms is coupled to an upper surface of said disk such that each of said plurality of arms extends upwardly from said disk;
said plurality of arms is evenly spaced apart from each other and is distributed around a center of said disk; and
each of said plurality of arms curves outwardly between said lower end and said upper end such that said plurality of arms curves toward each other at said upper end thereby facilitating said plurality of arms to define a spherical shape.

14. The device according to claim 13, wherein:
said upper end of each of said plurality of arms is scalloped;
each of said plurality of arms has a first surface and a second surface each extending between said lower end and upper end;
said first surface of each of said plurality of arms is concavely arcuate between said upper end and said lower end; and
said second surface of each of said plurality of arms is convexly arcuate between said upper end and said lower end.

15. The device according to claim 14, wherein:
each of said plurality of arms has a series of ridges being integrated into said second surface of said plurality of arms; and
said series of ridges on said second surface of each of said plurality of arms extending between said lower end and said upper end of said plurality of arms wherein said series of ridges on said second surface of each of said plurality of arms is configured to facilitate the wind to frictionally engage said series of ridges thereby enhancing said wind vane to be rotated by the wind.

16. A wind chime device for playing a composed melody for the listening enjoyment of a user, said device comprising:
a base being vertically elongated wherein said base is configured to extend a substantial height from a support surface, said base being substantially foraminous wherein said base is configured to facilitate sound and air to pass through said base, said base comprising:
a pedestal having a lower surface and an upper surface and an exterior surface extending between said lower surface and said upper surface, said exterior surface having a plurality of perpendicularly oriented sides such that said pedestal has a rectangular shape, said exterior surface having a first section being perpendicularly oriented with said lower surface and a second section angling inwardly from an upper threshold of said first section, said exterior surface having a third section extending upwardly from an upper threshold of said second section such that said third section lies on a plane being oriented parallel to said first section, said exterior surface having a fourth section angling outwardly from an upper threshold of said third section and a fifth section extending between from an upper threshold of said fourth section and said upper surface such that said fifth section lies on a plane being coplanar with said first section;
a box extending upwardly from said upper surface of said pedestal, said box being centrally located on said upper surface, said box having a bottom wall and a top wall and an outer wall extending between said bottom wall and said top wall, said outer wall having a plurality of holes each extending through a respective one of each of a first side and a second side and a third side of said outer wall, each of said plurality of holes having a bounding edge comprising a plurality of perpendicularly oriented sides such that each of said plurality of holes has a diamond shape, said plurality of holes on each of said first side and said second side and said third side being arranged in a plurality of columns extending along a substantial height of said first side and said second side and said third side, said outer wall having a fourth side being open into an interior of said box, said box having a slot extending through said top wall, said slot extending from said fourth side toward said second side having a terminal end of said slot being centrally located on said top wall, said box having a notch extending into said bottom wall, said notch extending from said fourth side toward said second side, said notch being centrally located between said first side and said third side, said box having a recess extending downwardly into a topmost surface of said top wall, said recess being continuously arcuate about said terminal end of said slot such that said recess defines a ring extending around said terminal end, said box having a depression extending downwardly into an uppermost surface of said bottom wall of said box, said depression being centrally located on said bottom wall, said depression having a bounding surface being concavely arcuate with respect to said uppermost surface;

a door having a first edge being hingedly coupled to a terminal edge of said third side of said outer wall of said box, said door being positionable in a closed position having said door covering said fourth side of said outer wall, said door being positionable in an open position having said fourth side being exposed to access said interior of said box; and a handle being attached to an outwardly facing surface of said door for gripping to facilitate said door to be manipulated between said open position or said closed position, said handle being aligned with a second edge of said door;

a chime unit being removably insertable into said base, said chime unit including a barrel and a comb, said comb including a plurality of bristles each having a unique length with respect to each other thereby facilitating each of said bristles to produce a sound of a unique pitch when said bristles are plucked, said barrel having a plurality of knobs each being strategically arranged on said barrel such that each of said knobs plucks respective ones of said plurality of bristles when said barrel is rotated thereby facilitating said chime unit to produce a melody wherein said chime unit is configured to enhance enjoyment of a user listening to said melody produced by said chime unit, said barrel having a bottom end and a top end and an exterior surface extending between said top end and said bottom end, each of said plurality of knobs extending outwardly from said exterior surface of said barrel, said plurality of knobs being spaced apart from each other and being distributed between said top end and said bottom end in a predetermined arrangement, said comb having a lower edge and an upper edge, said comb having a rear edge extending between said lower edge and said upper edge, said comb having a front edge extending between said lower edge and said upper edge, said comb having a plurality of slots each extending from said front edge toward said rear edge, said plurality of slots being evenly spaced apart from each other and being distributed between said lower edge and said upper edge such that said plurality of slots defines said plurality of bristles, said comb being comprised of a resonant material thereby facilitating said plurality of bristles to produce an audible sound when said plurality of bristles are plucked, said plurality of slots increasing in length between said lower edge and said upper edge thereby facilitating said plurality of bristles to produce said unique pitch with respect to each other, said chime unit including:

a first bearing being removably attachable to said top end of said barrel such that said first bearing defines a first space between said top end of said barrel and said first bearing, said first bearing including a first shaft extending upwardly from said first bearing;

a second bearing being removably attachable to said bottom end of said barrel such that said second bearing defines a second space between said bottom end of said barrel and said second bearing, said second bearing including a second shaft extending downwardly from said second bearing, said second shaft having a distal end being rounded;

a comb mount having a central member extending between an upper member and a lower member, each of said upper member and said lower member being perpendicular to said central member such said comb mount has a U-shape, said upper member extending into said first space defined between said first bearing and said top end of said barrel, said lower member extending into said second space defined between said second bearing and said bottom end of said barrel, said comb lying against said central member such that said rear edge of said comb is aligned with a back edge of said central member thereby aligning each of said bristles with exterior surface of said barrel, said comb mount having a finger extending downwardly from said lower member at a point being aligned with an intersection between said lower member and said central member, said finger having an upper section having a greater diameter than a lower section of said finger, said finger being aligned with said second shaft on said second bearing; and a pair of fasteners, each of said fasteners extending through said comb and engaging said comb mount for attaching said comb to said comb mount;

wherein said first shaft of said first bearing extends into said slot in said top wall of said box when said chime unit is inserted into said box such that said first shaft extends upwardly beyond said top wall of said box;

wherein said distal end of said second shaft on said second bearing is seated in said depression in said uppermost surface of said bottom wall of said box when said chime unit is inserted into said box such that said distal end conforms to curvature of said depression;

wherein said lower section of said finger on said comb mount is positioned in said notch in said bottom wall of said box when said chime unit is inserted into said box thereby inhibiting said comb mount from rotating when said chime unit is positioned in said box; and a wind vane being removably attachable to said chime unit, said wind vane being positioned above said base when said chime unit is positioned in said base wherein said wind vane is configured to be exposed to wind, said wind vane rotating said barrel of said chime unit when said wind vane is rotated thereby facilitating each of said plurality of knobs on said barrel to pluck said respective bristle on said comb wherein said wind vane is configured to facilitate said chime unit to produce said melody, said wind vane comprising:

a disk having a lower surface being attached to an upper end of said first shaft on said first bearing at a connection point being centrally located on said lower surface of said disk such that said disk is spaced upwardly from said top wall of said box when said chime unit is inserted into said box;

an annular ring extending downwardly from said lower surface of said disk, said annular ring surrounding said first shaft, said annular ring resting in said recess in said topmost surface of said top wall of said box when said chime unit is inserted into said box; and a plurality of arms, each of said plurality of arms having a lower end and an upper end, said lower end of each of said plurality of arms being coupled to an upper surface of said disk such that each of said plurality of arms extends upwardly from said disk, said plurality of arms being evenly spaced apart from each other and being distributed around a center of said disk, each of said plurality of arms curving outwardly between said lower end and said upper end such that said plurality of arms curves toward each other at said upper end thereby facilitating said plurality of arms to define a spherical shape, said upper end of each of said plurality of arms being scalloped, each of said plurality of arms having a first surface and a second surface each extending between said lower end and upper end, said first surface of each of said plurality of arms being concavely arcuate between said upper end and said lower end, said second surface of each of said plurality of arms being convexly arcuate between said upper end and said lower end, each of said plurality of arms having a series of ridges being integrated into said second surface of said plurality of arms, said series of ridges on said second surface of each of said plurality of arms extending between said lower end and said upper end of said plurality of arms wherein said series of ridges on said second surface of each of said plurality of arms is configured to facilitate the wind to frictionally engage said series of ridges thereby enhancing said wind vane to be rotated by the wind.

* * * * *